(12) United States Patent
Komara et al.

(10) Patent No.: US 6,253,060 B1
(45) Date of Patent: *Jun. 26, 2001

(54) METHOD AND APPARATUS EMPLOYING WIRELESS REMOTE LOOPBACK CAPABILITY FOR A WIRELESS SYSTEM REPEATER TO PROVIDE END-TO-END TESTING WITHOUT A WIRELINE CONNECTION

(75) Inventors: Michael A. Komara; Thomas R. Schmutz; Jeffrey R. Nuckols, all of Indialantic, FL (US); Roger L. Overton, New York; Thomasz Strzelec, Smithtown, both of NY (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/280,543

(22) Filed: Mar. 30, 1999

Related U.S. Application Data

(63) Continuation-in-part of application No. 08/772,181, filed on Dec. 20, 1996.
(60) Provisional application No. 60/079,794, filed on Mar. 30, 1998.

(51) Int. Cl.[7] ............................. H04B 7/155; H04B 17/02
(52) U.S. Cl. ............................. 455/9; 455/67.4; 455/11.1
(58) Field of Search .................................. 455/423, 67.1, 455/67.4, 9, 11.1, 424–425; 379/4, 5

(56) References Cited

U.S. PATENT DOCUMENTS

| | | | |
|---|---|---|---|
| 5,521,904 | * | 5/1996 | Eriksson et al. ..................... 455/67.4 |
| 5,754,560 | * | 5/1998 | Nousiainen et al. ................. 455/67.4 |
| 5,784,406 | * | 9/1999 | DeJaco et al. ....................... 455/67.4 |
| 5,953,637 | * | 9/1999 | Coons et al. ......................... 455/67.4 |

FOREIGN PATENT DOCUMENTS 5-30046 * 2/1993 (JP) ..................................... 455/67.4

* cited by examiner

*Primary Examiner*—Nguyen T. Vo
(74) *Attorney, Agent, or Firm*—Akerman Senterfitt

(57) ABSTRACT

A method and apparatus for using a loopback capability of a radio frequency (RF) repeater to provide for end-to-end testing without a wireline connection is disclosed. A RF source sends a signaling waveform to the RF repeater. Upon receiving the signaling waveform, the RF repeater enters the loopback mode. The RF source sends another identical signaling waveform to the RF repeater to end the loopback mode. In another embodiment, a base transceiver station (BTS) sends a signaling waveform to an intelligent RF repeater-translator upon detection of a lack of activity. The received signaling waveform places the intelligent RF repeater translator into a loopback mode. If alarms are present in the intelligent RF repeater-translator, the intelligent RF repeater-translator ceases processing and the BTS informs the OMC of the error condition. Otherwise, the loopback mode is entered and BTS initiates testing of the intelligent RF repeater-translator. The loopback mode is discontinued when the intelligent RF repeater-translator receives another identical signaling waveform or after a time-out period elapses. The intelligent RF repeater-translator has the capability to alternate the selected diversity uplink path from one loopback test to the next loop back test to ensure full testing of all RF paths.

9 Claims, 8 Drawing Sheets

METHOD AND APPARATUS EMPLOYING WIRELESS REMOTE LOOPBACK CAPABILITY FOR A WIRELESS SYSTEM REPEATER TO PROVIDE END-TO-END TESTING WITHOUT A WIRELINE CONNECTION

CROSS REFERENCE TO RELATED APPLICATIONS

This application is a continuation-in-part (CIP) application of U.S. patent application Ser. No. 08/772,181 filed on Dec. 20, 1996 and claims priority of provisional application Serial No. 60/079,794, filed Mar. 30, 1998.

FIELD OF THE INVENTION

This invention relates generally to the testing of wireless communication systems. In particular, this invention relates to providing a loopback capability in a wireless system repeater. More particularly, this invention relates to providing a loopback capability in a translating wireless system repeater.

BACKGROUND OF THE INVENTION

The use of cellular communication systems has grown rapidly in the past few years. When a subscriber carries a portable cellular telephone, the subscriber is accessible to other telephone users as long as the subscriber is in the cellular communication network. The mobility of the cellular telephone is a distinct advantage over conventional landline based telephones, which require that the user remain at or near the place where the telephone is connected to the landline network. The cellular communication can offer this improved mobility because the communication medium is wireless.

FIG. 8 is an illustration of a conventional cellular communication system.

A typical cellular communication system 800 can be thought of as a hierarchical network. A subscriber typically carries a mobile unit 802b such as a cellular phone. In order to gain access to the cellular communication network 800, the mobile unit 802b provides the user access to the cellular communication system 800. The mobile unit 802b interfaces with a base transceiver station (BTS) 804b.

The BTS 804b provides coverage for multiple subscribers in a specific geographic area, called a cell. As the mobile unit 802b enters the cell, the BTS 804b and the mobile unit 802b communicate with one another. Information from this initial exchange is used by the cellular communication system 800 so it can route calls to and from the mobile unit 802b.

The BTS 804a has a limited coverage area. As a result, one technique for providing coverage for a large geographic area is to install multiple BTS units. This strategy also provides the benefit of increasing capacity, so that the cellular system 800 can serve a larger number of subscribers within its coverage area. However, a major drawback to this solution is the high cost of a BTS. As an alternative, a repeater 806 is often used to improve coverage area, reduce cost, and improve clarity. Generally, repeaters receive a downlink signal from a BTS and retransmit the downlink signal to a mobile unit after the downlink signal has been amplified by a downlink amplifier. The process works similarly in reverse, where the repeater will amplify an uplink signal from a mobile unit to the BTS with an uplink amplifier. The amplifiers provide an increase in signal strength which improves the clarity of the calls and prevents dropped calls. To distinguish the direction of the signals transmitted and received by the repeaters, the path between the repeater and the BTS is referred to as the "backhaul" signal path.

In order to control and coordinate the multiple BTS units exemplified by 804a, 804b, they are interfaced with a base station controller (BSC) 808. The BSC 808 controls the wire and radio links between the multiple BTS units 804a, 804b and a Mobile Switching Center (MSC) 810.

The MSC 810 performs call processing functions such as transcoding and soft-hand-off. The MSC 810 also has a location register, where it stores the location information to track the location of the subscriber's mobile unit 802 throughout the cellular communication network. The MSC 810 also provides an interface to an external network. The external network is typically a landline phone network such as the public switched telephone network (PSTN) or integrated services digital network (ISDN).

The MSC 810 is also often interfaced with an Operation and Maintenance Center ("OMC") 812. The OMC 812 allows network engineers to oversee and maintain the cellular communication system 800. The OMC 812 monitors such things as call traffic, status, and fault processing. If the cellular communication system 800 is not operating within normal parameters, the OMC 812 would investigate and attempt to correct.

In order to sustain the increased use of cellular communication systems, providers have to ensure that the cellular communication system is fully functional at all times since subscribers will not tolerate an unreliable system. Maintaining full functionality becomes more difficult as the cellular communication systems become physically larger and spatially more diverse to accommodate the increased capacity of new users.

An example of the difficulty in maintaining the functionality of the cellular communication system is the testing and monitoring of repeaters. Repeaters serve to extend the range of coverage that can be provided by a single BTS unit. Therefore, it is important to keep the repeater functioning in order to maintain communication with the users in the outer or fringe areas of a cell. However, repeaters are often used in cellular communication networks because of their lower cost compared to a BTS. As a consequence, repeaters are often not designed with remote testing and monitoring capability.

Cellular communication network providers have attempted to increase the remote testing and monitoring capability of repeaters by attaching modems and telephone lines to the repeaters. In addition to testing that is required at initial deployment, a repeater may have sub-system functions or modules which, absent remote testing and monitoring capability, can only be tested or monitored on-site. On-site testing of remotely-located repeaters typically requires that a technician travel to the repeater site and employ specialized test equipment. Further, on-site testing usually requires that the repeater being tested be removed from service during the testing. In order to achieve remote monitoring, a telephone line is connected to the repeater via a modem. In the event of an error or failure within the functions or modules, the repeater would issue an alarm or error message through the modem and over the telephone line to an OMC. The OMC receives the error message and dispatches a repair crew.

Alternatively, an OMC could use the telephone line connection with the repeater to place the repeater in a test mode and attempt to locate the problem with a repeater in a given cellular communication network. However, both uses require that each repeater have an attached telephone line and an installed modem which adds to both the initial installation costs and the monthly maintenance costs of the cellular communication network.

A clear example of the difficulty with the testing and monitoring of repeaters is the testing of the uplink and downlink RF paths. This testing must be done at initial deployment of the repeater, and is often necessary subsequently, to adapt the repeater to changes in the cellular communications system. The repeater's uplink and downlink RF paths are tested to ensure that the repeater is properly detecting and receiving the appropriate input range power and outputting the appropriate output range power. To perform this testing, low-level signals are injected at the antenna inputs and high-power signals are measured at the antenna outputs. This type of testing typically requires specialized RF test equipment and a visit to the actual remote repeater site which adds to the difficulty of testing because of the equipment and manpower that needs to be brought to the repeater site. In addition, the repeater is usually taken "offline" during the testing which disables a part of the cellular communication network.

Whereas wireless repeaters use RF backhaul signals to communicate with a BTS, landline repeaters are connected to a host BTS by a wireline connection. Landline repeaters have successfully employed a solution to the problem of on-site testing and monitoring. U.S. Pat. No. 5,422,929 ('929) to Hurst et al. describes a method and apparatus for remotely testing and monitoring a landline repeater. A central office will send an interrogating signal with an address subfield. When the interrogating signal is recognized by a controller in the landline repeater, the controller causes the landline repeater to enter a loopback mode where diagnostic and test-indicative no-operation signals are returned. For a given landline, any repeater attached to the landline could be addressed and tested. Although '929 describes the testing and monitoring for landline repeaters through the existing landline communication channel, '929 does not describe the testing and monitoring through a wireless communication channel and testing of the uplink and downlink paths of a wireless repeater.

U.S. Pat. No. 5,785,406 ('406) to DeJaco et al. describes a method and apparatus for testing through a wireless communication channel. In the '406 patent, a test signal is generated from a monitoring station located on a PSTN. The test signal is routed through the PSTN to a cellular communication system to a cellular phone. The test signal activates a loopback element within the cellular phone and the signal is re-routed back to the monitoring station. The monitoring station performs an analysis on the returned test signal.

Although the '406 patent describes the use of the loopback element in a mobile cellular phone through a wireless communication channel, '406 fails to disclose this loopback element for a wireless repeater. Furthermore, '406 fails to disclose how to implement this testing for a repeater and for testing the uplink and downlink paths of the wireless repeater.

SUMMARY OF THE INVENTION

An object of the present invention is to provide an apparatus and method for the remote testing of repeaters within a wireless communication system without the use of attached modems and telephone lines.

Another object of the present invention is to provide a method and apparatus for using a wireless remote loopback capability for a wireless system repeater in order to provide end-to-end testing without a wireline connection.

Another object of the present invention is to provide a method and apparatus for using a wireless remote loopback capability for a wireless system repeater in order to test the downlink and uplink paths of the wireless system repeater remotely.

A further object of the present invention is to provide a method and apparatus for using a wireless remote loopback capability for a wireless system repeater in order to prevent removal of the wireless system repeater from service.

It is another object of the present invention to provide all of the advantages described above in a wireless system translating repeater.

The above and other objects are achieved by the principles of the present invention.

In accordance with the principles of the present invention, a radio frequency (RF) source sends a signaling waveform to an RF repeater, including the intelligent RF repeater-translator of the preferred embodiment. Upon receiving the signaling waveform, the RF repeater enters a loopback mode. The RF source then sends test signals to the RF repeater which are returned to the RF source for analysis. The RF source then ends the loopback mode by sending a second signaling waveform, which in the preferred embodiment is identical to the signaling waveform that initiates the method of the present invention.

In addition, in accordance with the principles of the present invention, a base transceiver station (BTS) upon detecting a lack of activity from an intelligent RF repeater-translator, sends a signaling waveform to the intelligent RF repeater-translator. Upon receiving the signaling waveform, the intelligent RF repeater-translator enters a loopback mode.

The intelligent RF repeater-translator, according to the principles of the present invention, may further comprise checking for alarms prior to entering the loopback mode. If alarms are present, the intelligent RF repeater-translator does not proceed any further. Detecting that the intelligent RF repeater-translator has not progressed, the BTS will inform an OMC of an error with the intelligent RF repeater-translator. Otherwise, the intelligent RF repeater-translator will enter the loopback mode.

In the loopback mode, the BTS will initiate testing of the intelligent RF repeater-translator until another identical signaling waveform is sent by the BTS. The intelligent RF repeater-translator will also automatically exit out of the loopback mode if it does not receive the second identical signaling waveform within a pre-set time period.

The intelligent RF repeater-translator has the capability to alternate the selected diversity uplink path from one loop back test to the next.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an improved method and apparatus for employing wireless loopback capability of a wireless system repeater-translator to provide end-to-end testing without a wireline connection.

Figure 1:
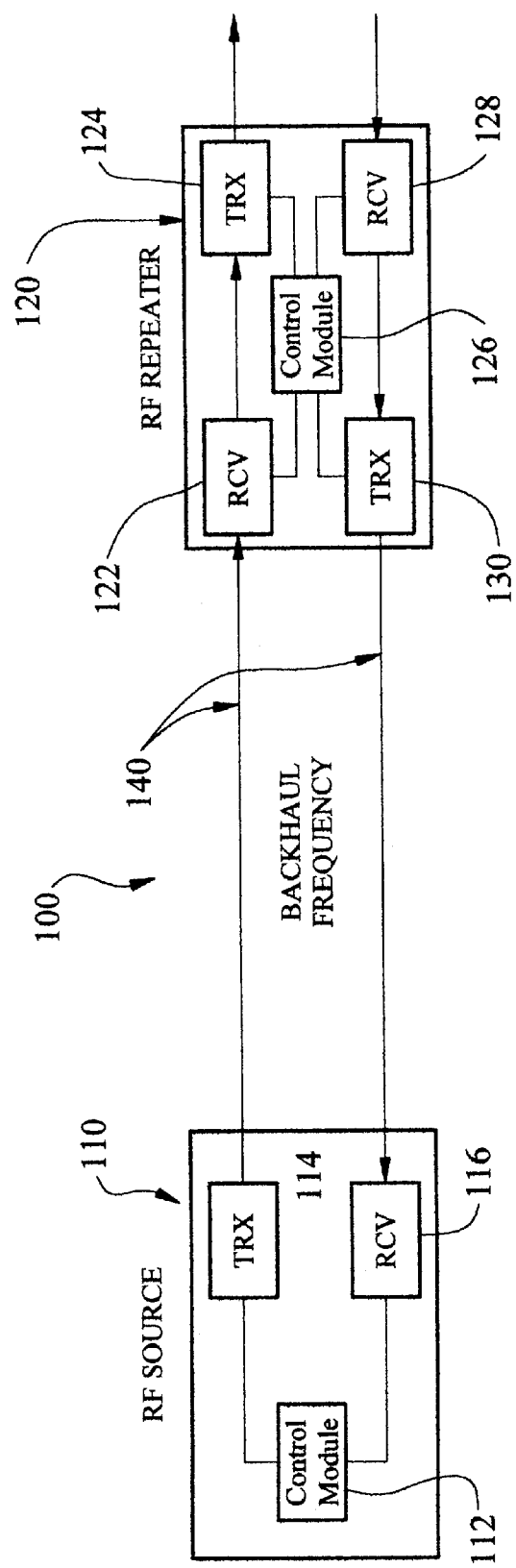
FIG. 1 is a block diagram of a system where the present invention is utilized.
Figure 2:
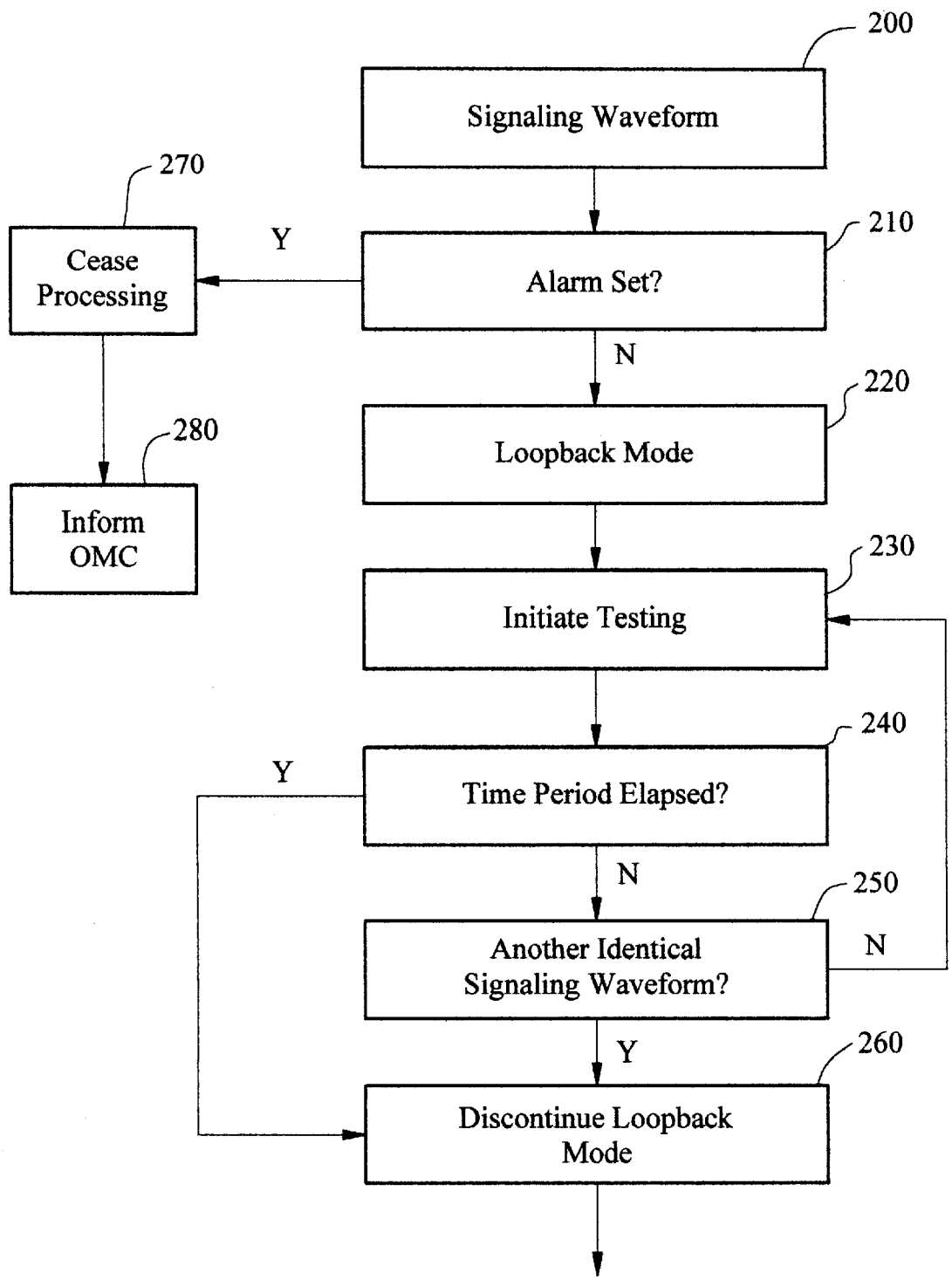
FIG. 2 is a flow diagram of an embodiment of the present invention.

FIG. 1 is a general illustration of the present invention in a wireless communication system 100 and FIG. 2 is a block diagram of the present invention working within the wireless communication system 100. Wireless communication system 100 has a RF source 110 and a RF repeater 120.

The RF source 110 is intended to be any type of source that emits RF signals. The RF source 110 has a control module 112 which is a combination of hardware and software which controls the operation of the RF source 110. The RF source 110 has a transmitter module 114 which transmits downlink signals to the RF repeater 120 over a backhaul frequency 140. Finally, the RF source 110 has a receiver module 116 which receives uplink signals from the RF repeater 120 also across the backhaul frequency 140.

The RF repeater 120 has a control module 126 which is a combination of hardware and software which controls the operation of the RF repeater 120. The RF repeater 120 has a downlink receiver module 122 which receives downlink signals from the RF source 110 over the backhaul frequency 140. The RF repeater 120 passes the downlink signals to the downlink transmitter module 124 which amplifies the received downlink signals and re-transmits the downlink signals. The RF repeater 120 also receives uplink signals through an uplink receiver 128. The uplink signals are passed to an uplink transmitter 130 which transmits the uplink signals to the RF source 110 over the backhaul frequency 140.

The RF source 110 may periodically or on demand, test the RF repeater 120 in order to make sure that the system is operating within normal operating parameters. The RF source 110, through the transmitter module 114, will send a signaling or control waveform 200 such as a continuous wave (CW) tone. After the RF repeater 120 receives the signaling waveform 200 through the downlink receiver 122, the control module 126 checks if there is an alarm condition 210.

If there is an alarm condition, then the RF repeater 120 will not proceed any further 270. After a certain time period has elapsed, the RF source 110 will sense the inactivity and signal the OMC that there is an error or fault condition 280.

Otherwise, if there is no alarm condition 210, the RF repeater 120 will place itself in the loopback mode 220. The control module 126 will route the received downlink backhaul signal from the downlink backhaul receiver 122 to the uplink backhaul transmitter 130.

After the RF repeater 120 is in the loopback mode, the control module 112 of the RF source 110 will send test signals to initiate testing 230. The test signals are received by the RF repeater 120 and returned to the RF source 110. The control module 112 performs an analysis on the returned signals such as signal propagation loss and timing offset.

Once testing is done, the control module 112 of the RF source 110 sends another signaling waveform 250 such as a CW tone. The received signaling waveform forces the control module 126 of the RF repeater 120 to take itself out of the loopback mode 260. The control module 126 routes the downlink receiver 122 to the downlink transmitter 124 and routes the uplink receiver 128 to the uplink transmitter 130.

Thus, the present invention provides for an improved method and apparatus for loopback testing of a RF repeater without the use of a wireline connection. The repeater is placed in a loopback mode through the normal communication channel between the repeater and a RF source. This eliminates the use of a separate wireline connection to control the RF repeater. Furthermore, using the RF source to send the test signals for analysis to the RF repeater eliminates the need for on-site testing.

Figure 3:
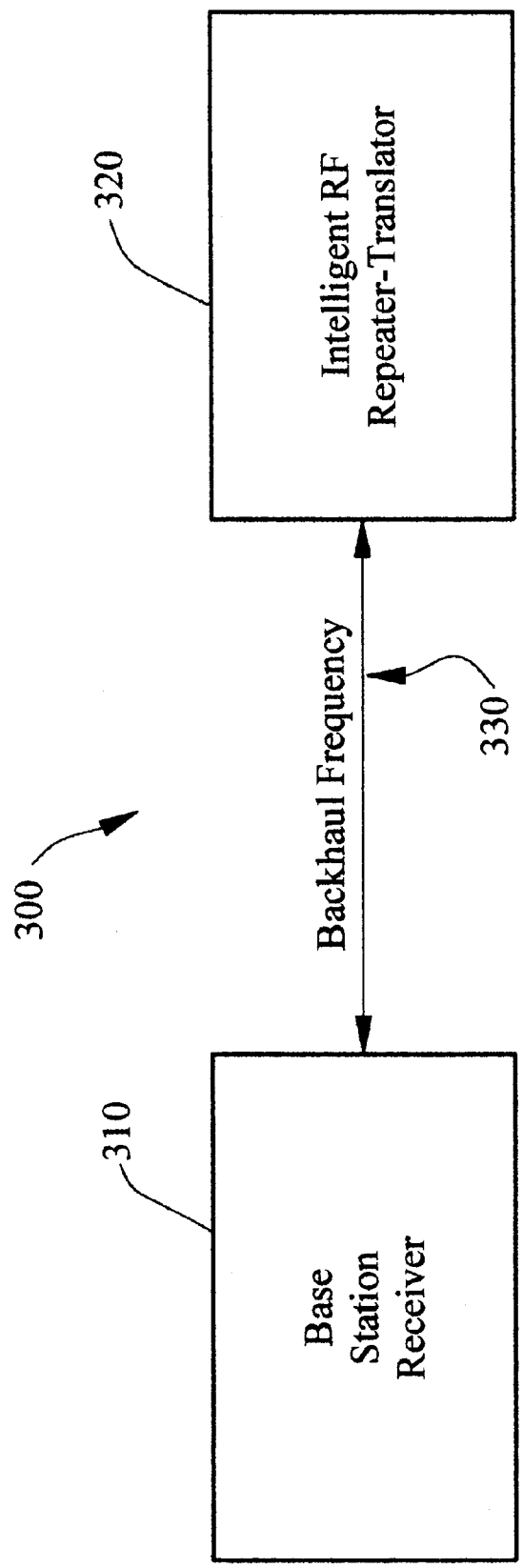
FIG. 3 is a second embodiment of the present invention used in a system with a base transceiver station and an intelligent RF repeater-translator.

FIG. 3 illustrates another embodiment of the present invention in a system 300 with a base transceiver station 310 and an intelligent RF repeater translator 320. The system 300 is part of a larger communication network which is compliant with the well known Global System for Mobile Communications (GSM)-900, GSM-1800, and GSM-1900 telecommunication standards based on time division multiplexing access (TDMA) protocol. The present invention is also capable of compliance with any other wireless telecommunications standards, including but not limited to IS41, PCS, and any proprietary standards where the present invention can be applied. The base transceiver station (BTS) 310 is transmitting control and data RF signals to the intelligent RF repeater-translator 320 over a backhaul frequency 330. In normal operations, a modulated Gaussian Minimum Shift Keyed (GMSK) carrier from the base station 310 is continuously transmitted in the backhaul downlink path from the BTS 310 to the intelligent RF repeater-translator 320. This signal is received by the intelligent RF repeater-translator 320 at a power level from −65 dBm to −95 dBm via a directional antenna. The signal is amplified, filtered, shifted in frequency, filtered again, level-controlled, and amplified to a high power level (e.g., +46 dBm) for transmission to a mobile subscriber. This remote ground downlink signal is typically transmitted via an omni-directional antenna to the mobile subscriber.

Figure 4:
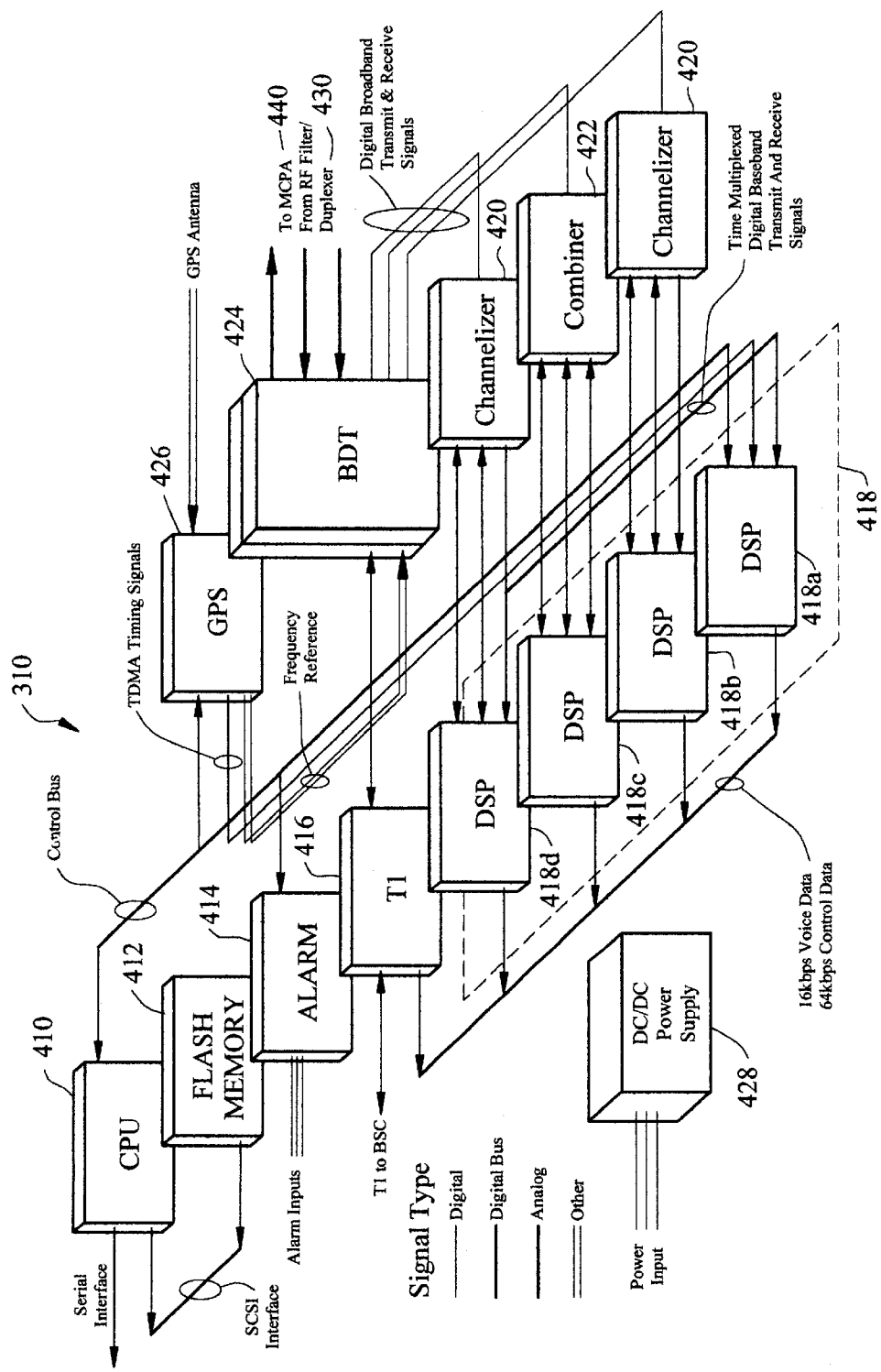
FIG. 4 is a block diagram of the base transceiver station of the system of FIG. 3.

FIG. 4 is a general block diagram of the base transceiver station of FIG. 3.

The BTS 310 contemplated by this embodiment of the invention differs from prior art versions of base transceiver stations. The architecture of BTS 310 is based on a software designed radio. This is an improvement over prior art base transceiver stations because it allows for the operation of the BTS 310 to be altered simply by loading new instructions.

The BTS 310 has a central processing unit (CPU) 410. The CPU hosts all of the BTS low-level control, call processing, and operation and maintenance application software.

The BTS 410 includes a flash memory module 412. The flash memory module 412 provides non-volatile storage of the real-time operating system and application software for the CPU and DSP modules 418. The flash memory module 412 also provides for specific configuration parameters for the BTS. During boot up or upon command, the BTS 310 validates the revision of software storage in the flash memory module 412 with a higher network entity such as a BSC. If the versions differ or there is an error, then the correct software version is downloaded to the BTS and stored on the flash memory module 412.

An alarm module 414 is part of the architecture of the BTS 310. The alarm module 414 permits detection and control of devices internal and external to the BTS 310. Internally, the alarm module 414 monitors a multi-carrier power amplifier (MCPA) 440, not shown, for fault conditions. The alarm module 414 also monitors a DC/DC power supply 428 for correct input and output voltages, as well as monitoring temperature sensors and air flow sensors. Externally, the alarm module 414 can monitor a bulk power system, security alarms, environmental alarms, fire, and other alarms.

A network interface module 416 is an additional element of the BTS 310 of this embodiment of the present invention. The network interface module 416 provides a single T1 line for an A-bis connection to a base station controller (BSC). This network interface module 416 supports up to ninety-two (92) 16 kbps sub-rate voice channels as well as a Link Access Procedure Direct (LAPD) protocol signaling channel across the A-bis interface to the BSC.

The BTS 310 has a digital signal processor (DSP) module 418, comprising multiple DSPs 418*a*–418*d* in the preferred embodiment. The DSP module 418 performs equalization, demodulation, and channel decoding from received channels of RF carriers that have been down-converted to a baseband signal by a BTS channelizer module 420. Likewise, it performs channel coding and modulation of 13 kbps voice channel data from the network interface module 416. The DSP module 418 multiplexes 8 RF channels into a single baseband signal for up-conversion and combining with other RF carriers by a BTS combiner module 422. Additionally, DSP module 418 performs the functions necessary for control, paging, and access channels.

Furthermore, diversity processing is performed on each received channel by the DSP module 418. Providing diversity processing in the DSP module 418 via software allows for easy upgrades as new algorithms are developed to improve signal quality.

Finally each DSP module 418 can process from one to three RF carriers and the BTS 310 will support up to four DSPs 418*a*–418*d*.

The channelizer module 420 receives a digital composite intermediate frequency (IF) signal from the BTS 310 via a broadband digital transceiver (BDT) 424. This composite IF signal consists of all of the 200 kHz RF carriers in a 5 MHz bandwidth. The channelizer module 420 filters and down-converts each RF carrier to a baseband signal for processing by the DSP module 418. The digital filter within the channelizer module 420 is software programmable, which provides significantly more flexibility and control for out-of-band signal rejection than the analog filtering typically used in conventional base transceiver stations.

Additionally, the channel bandwidth or spacing of the channelizer module 420 is also software programmable, allowing it to be used with other air-interface protocols with channel spacing other than 200 kHz as used with the GSM-1900 protocol.

The BTS 310 provides for two channelizer modules 420 for spatial diversity. The digital RF carrier signals from each channelizer module 420 are transferred to the same DSP module for diversity processing.

The combiner module 422, mentioned above, is the third element of the software designed radio of the BTS 310. The combiner module 422 performs the reciprocal function of the channelizer module 420. Baseband RF carriers are received from the DSP module 418. Each carrier is filtered and up-converted to a unique IF. All of the RF carriers in a 5 MHz bandwidth are simultaneously combined into a single composite IF signal. This digital IF is transferred to the BDT 424 for up-conversion to the appropriate RF band.

The BDT 424 of the BTS 310 consists of two wideband receivers, for diversity, and a wideband transmitter. Each receiver within the BDT 424 accepts at least a 5 MHz wide block of RF frequencies and down-converts the block to an IF center frequency. This IF signal is then digitized by a high performance analog-to-digital converter and the digital signal is transferred to the channelizer module 420 for de-multiplexing of individual RF carriers and further down-conversion to baseband.

On the transmit side, the BDT 424 receives a digital broadband signal from the combiner module 422. It converts this signal to analog with a high performance digital-to-analog converter. This IF signal is then up-converted to the appropriate RF frequency.

Finally, the 5 MHz bandwidth of the BDT 424 is software tunable anywhere across the RF band of the GSM-1900 allocated spectrum.

The BTS 310 has a Global Positioning System (GPS) module 426. The module provides an extremely accurate and low cost frequency and time reference used by the BDT 424. With this frequency reference, no periodic maintenance is required to calibrate the BDT 424. Traditional transceiver systems typically require periodic adjustment to maintain frequency accuracy.

Additionally, the GPS module 426 provides the time alignment for the time division multiplexing access (TDMA) time slots of the RF signals. This allows for the synchronization of multiple BTSs, providing smoother, faster hand-overs between cells.

Since only time information and not position data is required from the GPS system, the BTS needs to track only one GPS satellite. In the event of momentary loss of the GPS satellite signal, Kalman filtering within the GPS module 426 maintains frequency accuracy within the GSM-1900 standard for greater than 24-hour period.

The BTS 310 unit is powered by a DC/DC power supply module 428. This module accepts +24 VDC from an external power supply (not shown) and generates the voltages necessary to power the other individual modules of the BTS 310.

The BTS 310 also includes a RF filter/duplexer module (not shown) 430. The RF filter/duplexer module 430 filters RF signals within a specific GSM-1900 band. The RF filter/duplexer module 430 outputs two received signals, one from each of its diversity receive antenna inputs, to the BDT 424. Likewise, it interfaces to the output of the multi-carrier power amplifier 440 and combines this transmit signal with one of the receive inputs, implementing the duplex function. This allows a single antenna connection for both the transmit signal and one of the diversity receive RF signals.

Finally, the BTS 310 has a multi-carrier power amplifier (MCPA) 440 (not shown). The MPCA 440 is an ultra-linear, multi-carrier, high power amplifier. It receives the composite broadband signal from the BDT 424 and provides typically 48 dB of gain. The power output of individual RF carriers are determined by downlink power control algorithms entirely within the BTS 310.

The intelligent RF repeater-translator 320 implements the functionality of prior art repeaters. However, as prior art repeaters use multiple RF channels, the intelligent RF repeater-translator has a single RF channel with an integrated backhaul transceiver. The intelligent RF repeater-translator 320 also has the feature of being a frequency translating repeater. The intelligent RF repeater-translator 320 receives a mobile subscriber's uplink signal, translates it to a backhaul frequency and transmits the signal to a BTS 310. Likewise, the reverse operation is performed on the downlink. The BTS 310 transmits the downlink signal intended for the mobile subscriber on an in-band backhaul frequency. The intelligent RF repeater-translator receives the signal, translates it to the downlink frequency of the mobile subscriber, and transmits to the mobile subscriber.

Figure 5:
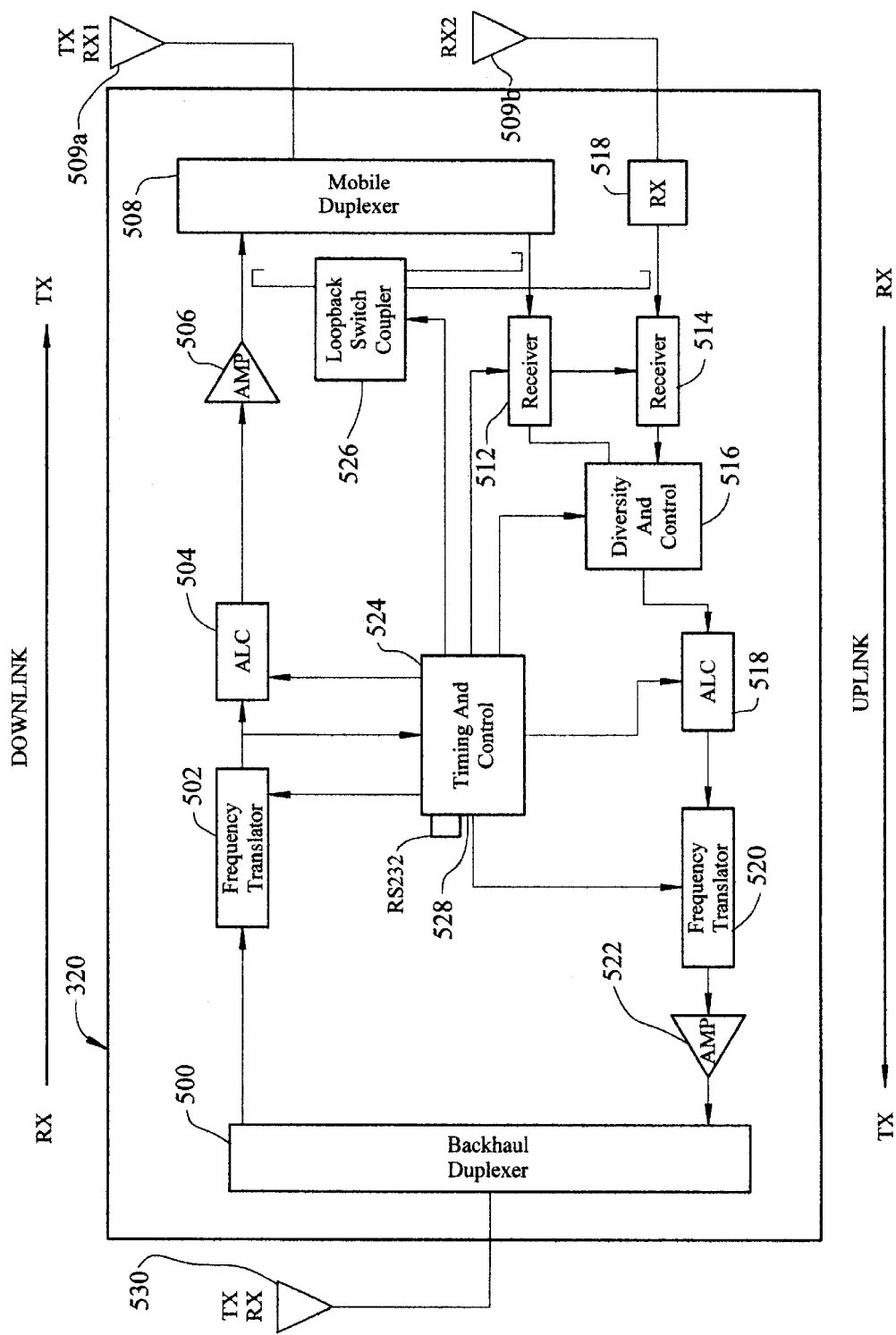
FIG. 5 is a more detailed block diagram of the intelligent RF repeater-translator in FIG. 3.

FIG. 5 is a block diagram of the intelligent RF repeater translator of FIG. 3.

The intelligent RF repeater-translator 320 can be thought of as having two paths: a downlink path and an uplink path. In the downlink path, an RF signal from the BTS 310 is received at the backhaul duplexer 500. The backhaul duplexer 500 has an input range of −65 dBm to −95 dBm, with a target receive level of −70 dBm. The backhaul duplexer 500 filters the received RF downlink signal and also provides the isolation from an uplink signal, allowing a single antenna connection for both the uplink and downlink backhaul signals.

The received RF downlink signal is passed to a frequency translator 502. The frequency translator translates the received RF frequency from the backhaul frequency to the mobile subscriber frequency. The translated received RF downlink signal is then passed to a downlink automatic level control circuit (ALC) 504.

The downlink ALC 504 samples the received downlink RF signal to adjust the gain of a downlink amplifier 506. After the received downlink RF signal is amplified by the downlink amplifier 506, it is passed to a mobile duplex filter 508.

The mobile duplex filter 508 filters the amplified received downlink RF signal and transmits the received RF downlink signal to the mobile subscriber. The mobile duplex filter 508 also provides isolation from uplink signals received from the mobile subscribers.

The uplink path of the intelligent RF repeater-translator 320 begins with a received uplink signal from the mobile subscriber, received at the diversity receive antennae 509*a* and 509*b*. Diversity receive antenna 509*a* is a combined receive/transmit antenna, typically omni-directional. The received diversity uplink signal is sent from diversity receive antennae 509*a* to the mobile duplex filter 508. The received uplink signal is filtered by the mobile duplex filter 508 and passed to an uplink receiver 512.

The uplink signal is also received by the diversity receive only antenna 509*b*, from which it is directed to a receive-only filter 510. The receive-only filter 510 isolates the uplink signal and passes it on to a second receiver 514.

The filtered diversity uplink signals from both uplink receivers 512, 514 are passed to a diversity selection circuit 516. The diversity selection circuit 516 selects the strongest of the diversity signals on a GSM time slot basis.

From the diversity circuit 516, the strongest uplink signal is passed to an uplink ALC 518. The uplink ALC samples the input to adjust the gain of uplink amplifier 522. Prior to amplification, the uplink signal is passed to a uplink frequency translator which translates the uplink signal from the mobile subscriber frequency to the backhaul frequency.

The translated uplink signal is then passed to the uplink amplifier 522, filtered by the BTS backhaul duplexer 500, and passed through the directional backhaul transmit/receive antenna 530.

The intelligent RF repeater-translator 320 is controlled by a timing/control module 524. The timing/control module 524 provides the necessary hardware and software to perform all the functionality of the intelligent RF repeater-translator 320. The timing/control module 524 has an RS-232 serial port 528. The RS-232 port 528 can be used to input a command to place the intelligent RF repeater-translator 320 in a loopback mode. The intelligent RF repeater-translator 320 can be placed out of loopback mode by another command placed through the RS-232 port 528. Finally, the timing/control module 524 also controls a loopback switch/coupler 526.

The loopback switch/coupler 526 places the intelligent RF repeater-translator 320 in a loopback mode in response to a signal from the timing/control module 524. In loopback mode, the intelligent RF repeater-translator 320 routes a downlink transmit signal from the downlink amplifier 506 to both of the uplink receivers 512, 514.

Figure 6:
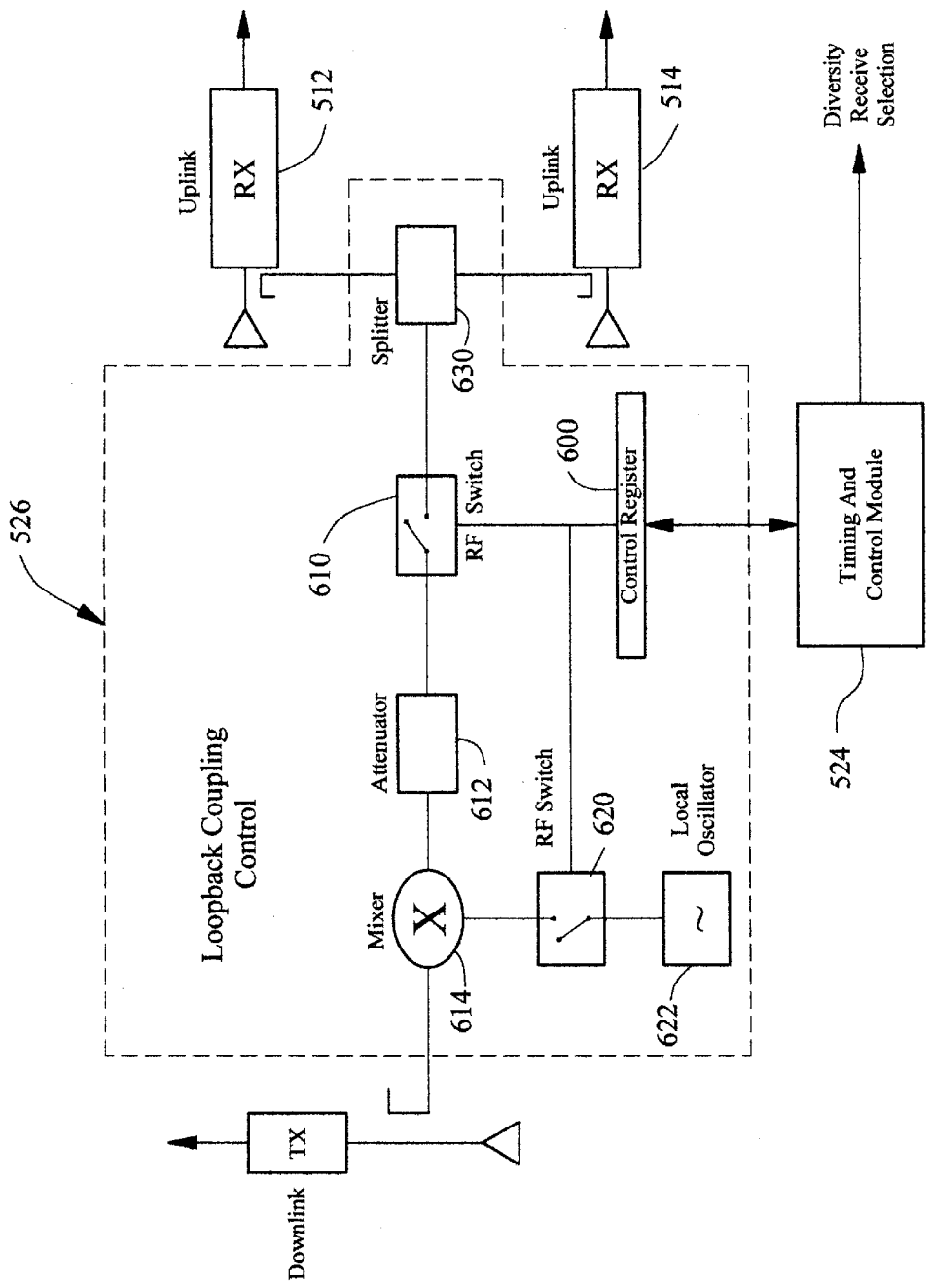
FIG. 6 is a more detailed diagram of a loopback control in the intelligent RF repeater-translator in FIG. 4.

The loopback switch/coupler 526 is further illustrated in FIG. 6. A control register 600 is programmable by the timing/control module 524. The control register 600 determines the operation of RF switches 610 and 620. The downlink transmit signal, 1930–1990 MHz in the preferred embodiment, is coupled, mixed at the mixer 614 (by 80 MHz in the preferred embodiment), attenuated at the attenuator 612, split via splitter 630, and coupled into both uplink receive paths, 1850–1910 MHz in the preferred embodiment. Switch 610 can be set to send the coupled and mixed downlink signal to the uplink receivers 512, 514 while simultaneously applying a local oscillator 622 to the mixer via RF switch 620. The timing/control module 524 also operates the diversity receive control switch 630 to select between either uplink receiver 512, 514, to toggle from the last selected uplink receiver 512, 514. By looping back the downlink transmit signal into both uplink receive paths, nearly all items in the RF signal path are tested. One final note, while the intelligent RF repeater-translator is in the loopback mode, it is still broadcasting received downlink signals to the mobile subscribers.

Figure 7:
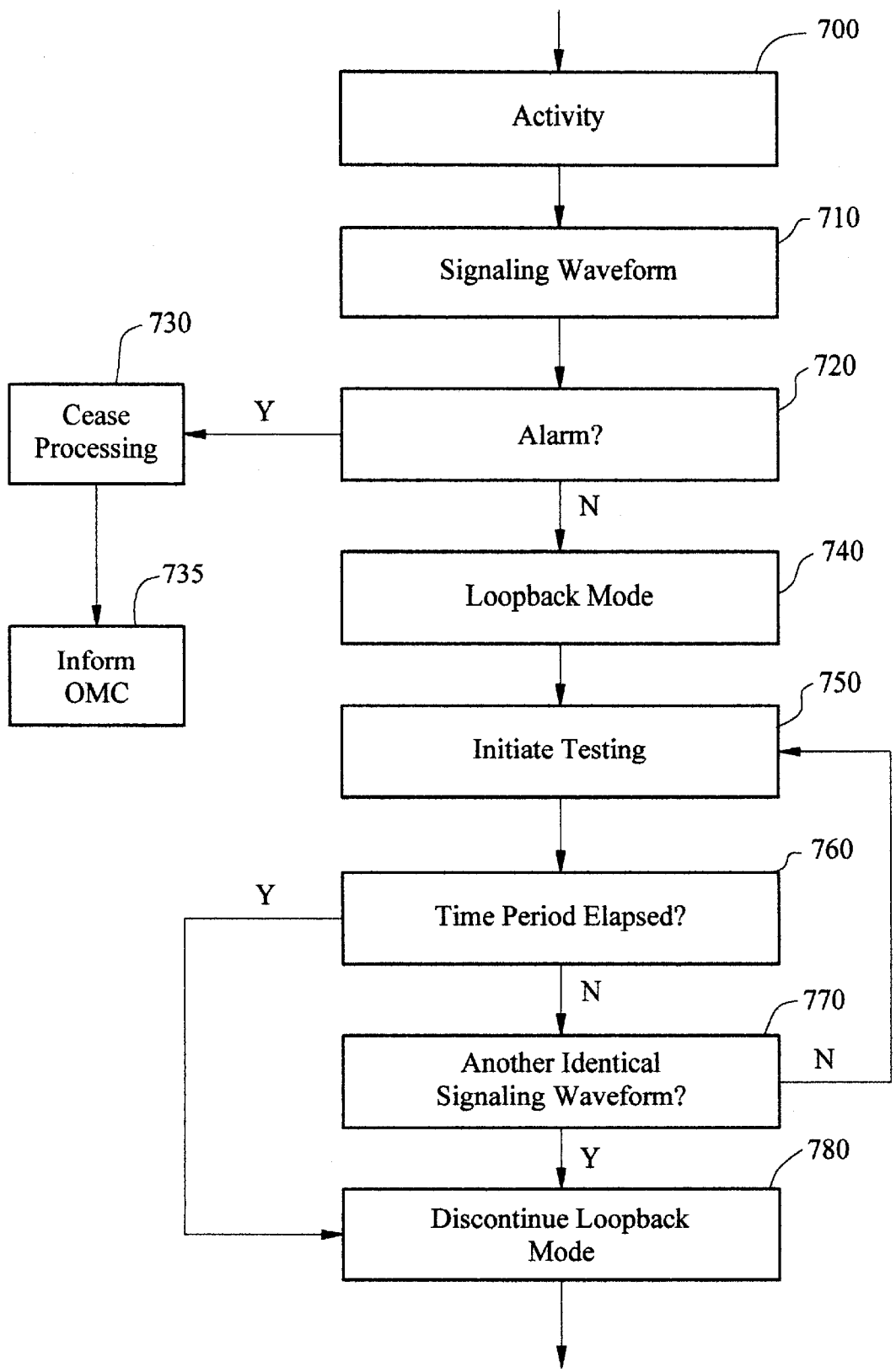
FIG. 7 is an illustration of the second embodiment of the present invention in the system of FIG. 3.
Figure 8:
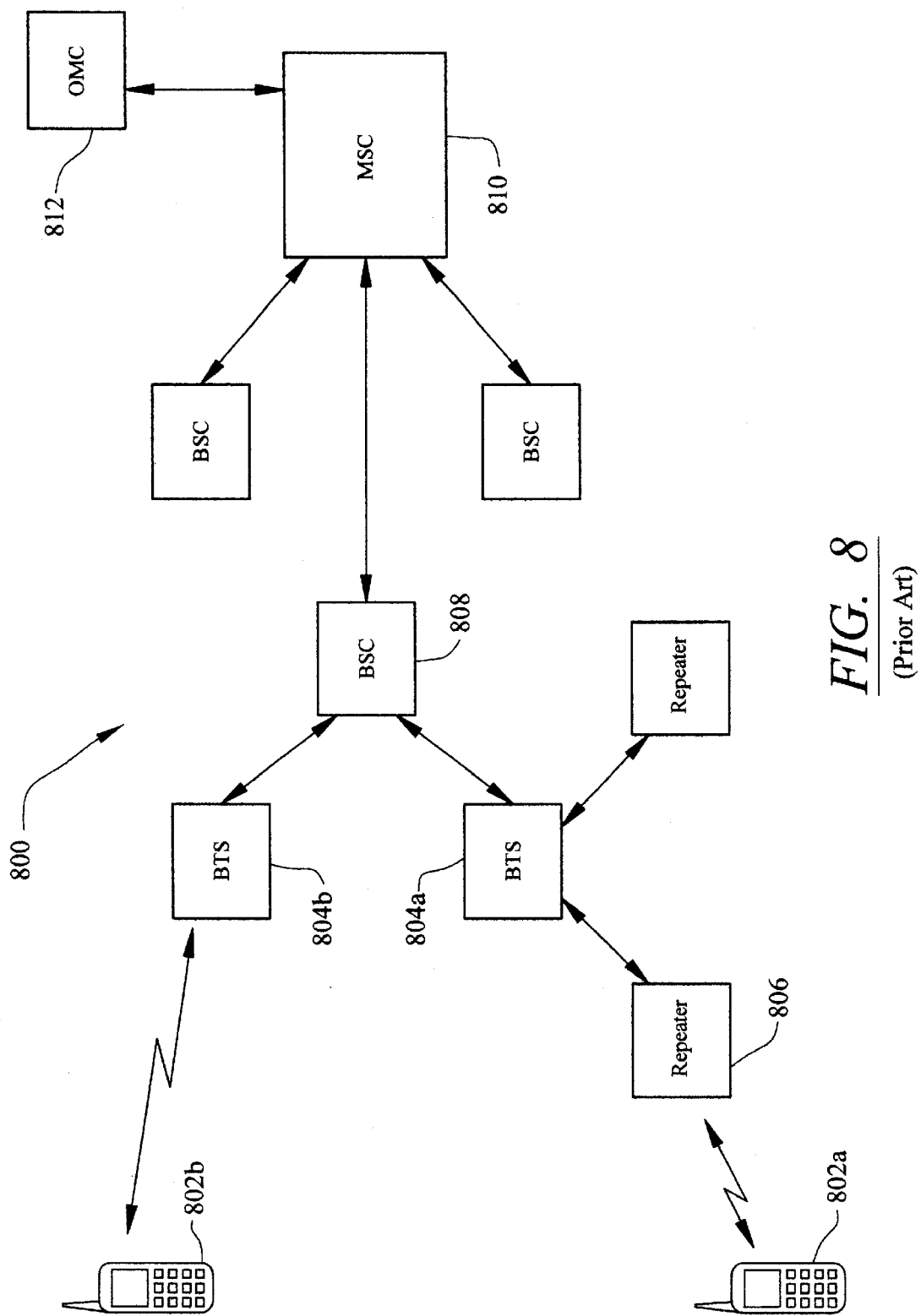
FIG. 8 is a illustration of the typical cellular communication system.

FIG. 7 is a block diagram of an embodiment of the present invention used in the system of FIG. 3.

In the system 300, the BTS 310 monitors the activity of the intelligent RF repeater-translator 320. If there is no activity for a certain time period 700, e.g. five minutes, the BTS 310 will send a signaling waveform 710. The signaling waveform could be a CW tone of a certain duration such as four frames, each frame lasting 18.46 msec. The signaling waveform is sent over the downlink frequency of the BTS.

When the intelligent RF repeater translator 320 receives the signaling waveform 710, the intelligent RF repeater translator 320 checks whether or not there are any alarms 720.

If there is an alarm within the intelligent RF repeater translator 320, the intelligent RF repeater translator 320 does not progress any further with the loopback function. After detecting a lack of activity 730, the BTS 310 will notify OMC of a problem 735.

Otherwise, the intelligent RF repeater translator 320 will enable the loopback mode 740 by setting the appropriate values in the control register 600 of the loopback switch/coupler 526. The loopback switch/coupler 526 will route the signals from the downlink amplifier 506 to the two uplink input receivers 512, 514.

Once in the loopback mode, the BTS 310 will initiate testing 750. The BTS 310 will send specific random access control channel (RACH) bursts on the downlink path and detect the looped back bursts on the returned uplink signal. This process allows for accurate timing calculations to and from the intelligent RF repeater translator 320 ground antennae 509*a*, 509*b* as well as a measure of signal strength and signal quality of the complete RF path. Since the intelligent RF repeater translator 320 captures all of its signal timing from the downlink signal, it is necessary to continue to send modulated data in every slot of TDMA frame while performing the testing. If data is not sent in every frame, then the intelligent RF repeater translator 320 will lose synchronization with the BTS 310. Finally, the RACH burst can be looped back through either diversity channel for complete testing.

Once the testing is done, the BTS 310 will send another signaling waveform to end loopback testing 770. In the preferred embodiment, the signaling waveform to end testing 770 is identical to the signaling waveform 710 sent at the start of the loopback testing process. However, if the BTS 310 does not send the signaling waveform to end testing 770 within a programmable specific time period 760, then the intelligent RF repeater translator 320 will automatically discontinue the loopback mode 780. After exiting the loopback mode, the BTS and intelligent RF repeater translator resume normal operation.

Thus, the present invention provides for an improved method and apparatus for loopback testing of an intelligent RF repeater translator without the use of a wireline connection. The intelligent RF repeater translator is placed in a loopback mode through the normal communication channel between the intelligent RF repeater translator and serving BTS. This eliminates the use of a separate wireline connection to control the intelligent RF repeater translator. Furthermore, using the BTS to send the test signals to the intelligent RF repeater translator eliminates the need for on-site testing.

While the invention has been described with reference to the exemplary embodiments thereof, those skilled in the art will be able to make various modifications to the described embodiments of the invention without departing from the true spirit and scope of the invention.

What is claimed is:

1. A method for testing a radio frequency (RF) source and an RF repeater, said RF redeater for receiving a first radio signal from a mobile station and retransmitting said first radio signal on a backhaul channel to said RF source, and for receiving a second radio signal from said RF source on said backhaul channel and retransmitting said second radio signal to said mobile station, comprising:

sending a first loopback mode signaling waveform over a wireless medium to said RF repeater from said RF source to enable a loopback mode in said RF repeater;

sending from said RF source a test signal to said RF repeater over said wireless medium; and automatically retransmitting over said wireless medium said test signal from said RF repeater to said RF source on a translated frequency.

2. The method according to claim 1, further comprising:

testing said RF repeater by automatically comparing signal amplitude of said test signal sent from said RF source to said automatically retransmitted test signal received at said RF source from said RF repeater.

3. The method according to claim 1, further comprising:

testing said RF repeater by automatically comparing signal frequency response of said test signal sent from said RF source to the signal frequency response of said automatically retransmitted test signal received at said RF source from said RF repeater.

4. The method according to claim 1, further comprising:

testing said RF repeater by automatically comparing a signal time delay of said test signal sent from said RF source to said automatically retransmitted test signal received at said RF source from said RF repeater.

5. The method according to claim 1, further comprising:

discontinuing said loopback mode upon receiving in said RF repeater a second signaling waveform.

6. The method according to claim 5, wherein said second signaling waveform is identical to said first signaling waveform.

7. An apparatus for testing a radio frequency (RF) source and an RF repeater, said RF repeater for receiving a first radio signal from a mobile station and retransmitting said first radio signal on a backhaul channel to said RF source, and for receiving a second radio signal from said RF source on said backhaul channel and retransmitting said second radio signal to said mobile station, comprising:

means for sending a first loopback mode signaling waveform over a wireless medium to said RF repeater from said RF source;

means for enabling a loopback mode in said RF repeater upon receiving said signaling waveform; and means for sending a test signal from said RF source to said RF repeater over said wireless medium;

means for automatically retransmitting over said wireless medium said test signal from said RF repeater to said RF source on a translated frequency.

8. The apparatus according to claim 7 further comprising:

means for discontinuing said loopback mode upon receiving in said RF repeater a second signaling waveform.

9. The apparatus according to claim 8 wherein said second signaling waveform is identical to said first signaling waveform.

* * * * *

UNITED STATES PATENT AND TRADEMARK OFFICE
CERTIFICATE OF CORRECTION

PATENT NO.     : 6,253,060 B1
DATED          : June 26, 2000
INVENTOR(S)    : Komara et al.

It is certified that error appears in the above-identified patent and that said Letters Patent is hereby corrected as shown below:

<u>Title page,</u>
Item [75], Inventors section, replace "Thomasz" with -- Tomasz --.

<u>Column 11,</u>
Line 43, replace "redeater" with -- repeater --.

Signed and Sealed this

Second Day of April, 2002

*Attest:*

*Attesting Officer*

JAMES E. ROGAN
*Director of the United States Patent and Trademark Office*